United States Patent
Smith et al.

(10) Patent No.: US 6,792,540 B1
(45) Date of Patent: Sep. 14, 2004

(54) DATA REPLICATION SECURITY

(75) Inventors: Wayne E. Smith, Palo Alto, CA (US); Alan Robert Downing, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 09/321,624

(22) Filed: May 28, 1999

Related U.S. Application Data

(60) Provisional application No. 60/086,985, filed on May 28, 1998.

(51) Int. Cl.[7] .............................. H04L 9/00; B06F 12/00
(52) U.S. Cl. .............................. 713/200; 707/9; 707/201
(58) Field of Search ................................ 713/200, 201, 713/202, 1, 8, 9; 707/200, 201, 203, 500, 511; 715/500.1, 511

(56) References Cited

U.S. PATENT DOCUMENTS

| | | | |
|---|---|---|---|
| 4,631,673 A | | 12/1986 | Haas et al. |
| 5,261,102 A | * | 11/1993 | Hoffman ............ 713/200 |
| 5,379,423 A | * | 1/1995 | Mutoh et al. ............ 707/204 |
| 5,418,966 A | | 5/1995 | Madduri |
| 5,440,735 A | | 8/1995 | Goldring |
| 5,452,448 A | | 9/1995 | Sakuraba et al. |
| 5,553,279 A | | 9/1996 | Goldring |
| 5,613,113 A | | 3/1997 | Goldring |
| 5,706,509 A | | 1/1998 | Man-Hak Tso |
| 5,729,734 A | * | 3/1998 | Parker et al. ............ 707/9 |
| 5,737,601 A | | 4/1998 | Jain et al. |
| 5,787,427 A | * | 7/1998 | Benantar et al. ............ 707/9 |
| 5,806,075 A | | 9/1998 | Jain et al. |
| 5,870,759 A | | 2/1999 | Bauer et al. |
| 5,870,765 A | | 2/1999 | Bauer et al. |
| 5,926,816 A | | 7/1999 | Bauer et al. |
| 5,963,959 A | * | 10/1999 | Sun et al. ............ 707/200 |
| 5,995,980 A | | 11/1999 | Olson et al. |
| 5,999,936 A | | 12/1999 | Pattison et al. |
| 6,006,232 A | | 12/1999 | Lyons |
| 6,151,602 A | | 11/2000 | Hejlsberg et al. |
| 6,205,418 B1 | * | 3/2001 | Li et al. ............ 704/8 |
| 6,272,502 B1 | | 8/2001 | Lieuwen et al. |
| 6,289,335 B1 | | 9/2001 | Downing et al. |
| 6,532,479 B2 | * | 3/2003 | Souder et al. ............ 707/201 |

OTHER PUBLICATIONS

Feeney, "Security Issues and Features of Database Management Systems", Jul. 1986, Information Age, vol. 8, #3, via dialog text search, abstract.*

* cited by examiner

*Primary Examiner*—Ayaz Sheikh
*Assistant Examiner*—Christopher Revak
(74) *Attorney, Agent, or Firm*—Ditthavong & Carlson, P.C.

(57) ABSTRACT

An approach is described for improved security during data replication, in which a refresh program runs in the security domain of a trusted user. The refresh program first checks to see if the requesting user actually owns the snapshot before reconciling differences in refreshing a snapshot. Untrusted users are granted only connect privileges and the ability to run a refresh program.

11 Claims, 5 Drawing Sheets

DATA REPLICATION SECURITY

RELATED APPLICATIONS

The present application claims the benefit of U.S. Provisional Application No. 60/086,985 entitled "Replication for Front Office Replication" filed on May 28, 1998 by Benny Souder, Alan Downing, Harry Sun, Alan Demers, James Stamos, John Graham, and Curtis Elsbernd, the contents of which are hereby incorporated by reference herein.

The present application is related to the following commonly-assigned U.S. patent applications, the contents of all of which in their entirety are hereby incorporated by reference herein:

U.S. appliation Ser. No. 09/322,153 entitled "Data Replication for Front Office Automation" filed on May 28, 1999 by Benny Souder, Alan Downing, Harry Sun, Alan Demers, James Stamos, John C. Graham, Curtis Elsbernd, Mahesh Subramaniam, an d Wayne E. Smith which is now U.S. Pat. No. 6,532,479;

U.S. appliation Ser. No. 09/321,622 entitled "Lightweight Data Replication" filed on May 28, 1999 by Sukanya Balaraman, Alan Downing, John C. Graham, Lewis S. Kaplan, Benny Souder, and Harry Sun;

U.S. appliation Ser. No. 09/321,625 entitled "Mass Deployment of Front Office Applications" filed on May 28, 1999 by Curtis Elsbernd, Benny Souder, and Wayne E. Smith which is now U.S. Pat. No. 6,529,904; and U.S. appliation Ser. No. 09/321,594 entitled "Schema Evolution in Replication" filed on May 28, 1999 by Alan Demers, Curtis Elsbernd, James Stamos, and Lik Wong.

FIELD OF THE INVENTION

The present invention relates to database systems and more particularly to data replication security.

BACKGROUND OF THE INVENTION

Under certain conditions, it is desirable to make copies of a particular body of data, such as a relational database table, at multiple sites. The mechanism for maintaining multiple copies of the same body of data at multiple sites is generally referred to as "data replication." In a distributed database system using data replication, multiple replicas of data exist in more than one database in the distributed database system.

One kind of data replication employs snapshots. A snapshot is a body of data constructed of data from one or more "master" tables, views, or even other snapshots, any of which can be stored locally or remotely relative to the snapshot. The data contained within the snapshot is defined by a query that references one or more master tables (and/or other database objects) and reflects the state of its master tables at a particular point in time. To bring the snapshot up-to-date with respect to the master tables, the snapshot is refreshed upon request, e.g. at a user's command or automatically on a periodic, scheduled basis.

There are two basic approaches for refreshing a snapshot. "Complete refreshing" involves reissuing the defining query for the snapshot and replacing the previous snapshot with the results of the reissued query. "Incremental refresh" or "fast refresh" refers to identifying the changes that have happened to the master tables (typically, by examining a log file of the changes) and transferring only the data for the rows in the snapshot that have been affected by the master table changes. An "updatable snapshot" is a snapshot to which updates may be directly made, which are propagated from the snapshot back to the master table before refreshing.

Traditionally, snapshots have been implemented for high-end computer systems, which are characterized by the use of high performance computers that are interconnected to one another by highly reliable and high bandwidth network links. Typically, highly experienced database administrators manage these high-end systems. Due to the expense of these high-end computers, high-end distributed systems tend to involve a small number of networked sites, whose users can be trusted at least in part because of the physical security of the computers.

Recently, there has been much interest in the marketplace for applications for front office automation. One example is sales force automation, where hundreds, if not thousands, of sales representatives in a company are given laptops to improve their productivity. The laptops are loaded with applications, for example, to help a sales representative sell the company's products to a customer and take the customer's order. Therefore, the laptops include a data store to keep the customer and order information handy for use by a specific sales representative.

Front office automation, however, challenges the operating assumptions behind the high-end snapshot implementations. For example, replication in a front office automation environment must contend with the very real possibility that laptops get lost or stolen, for example, in airports. Although logins and passwords protect the connections between the laptop and the master site, this authentication mechanism cannot be fully trusted as secure because sales representatives often record their passwords near their laptops, for example, taped near the screen. The above-described high-end snapshot replication approach, however, relies on trusted snapshot users, granting them extensive privileges in support of the snapshot refreshes being driven from the client site. If such a high-end approach is implemented for laptops, a malicious person could easily steal a sales representative's laptop, connect to the master site using the password taped to the side of the laptop, and hack into the system, reading and destroying sensitive data.

SUMMARY OF THE INVENTION

There is a need for an implementation of snapshot replication that is secure in a front office automation environment without incurring the above-described and other disadvantages incumbent in a high-end implement of snapshot replication. This and other needs are addressed by the present invention in which a refresh program runs in the security domain of a trusted user. In common implementation environments, untrusted users are granted only connect privileges and the ability to run the refresh program, which first checks to see if the requesting user actually owns the snapshot. Thus, security is enhanced because knowing the password for a sales representative only gives an unauthorized user the ability to refresh the snapshot and little if nothing else. Furthermore, administration of security privileges is simplified because the privileges to access the master tables in refreshing the snapshot is not granted to the hundreds of untrusted users but once to the trusted user.

Accordingly, one aspect of the invention pertains to a computer-implemented method and a computer-readable medium bearing instructions for a method of secure replication, comprising the steps of: authenticating a first user; receiving a request from the first user to refresh a replica of a body of data; and, in response to receiving the request, refreshing the replica in a security domain of a trusted user. In one embodiment, the methodology also includes storing metadata about the replica of the body of data, which identifies the owner of the replica of the body of data, as well as accessing the metadata about the replica of the body of data to identity an owner of the replica of the body of data.

Another aspect of the invention involves a computer-implemented method and a computer-readable medium bearing instructions for a method of secure replication. In accordance with this methodology, metadata about a replica of a body of data is stored that identifies the owner of the replica of the body. An untrusted user is authenticated, as by login and password. When the untrusted user requests to refresh the replica, the identify of the untrusted user is compared with the owner of the replica according to the metadata. If the identity of the untrusted user and the owner of the replica of the body of data are the same, then refreshing the replica in a security domain of a trusted user.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, article, and apparatus for secure replication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
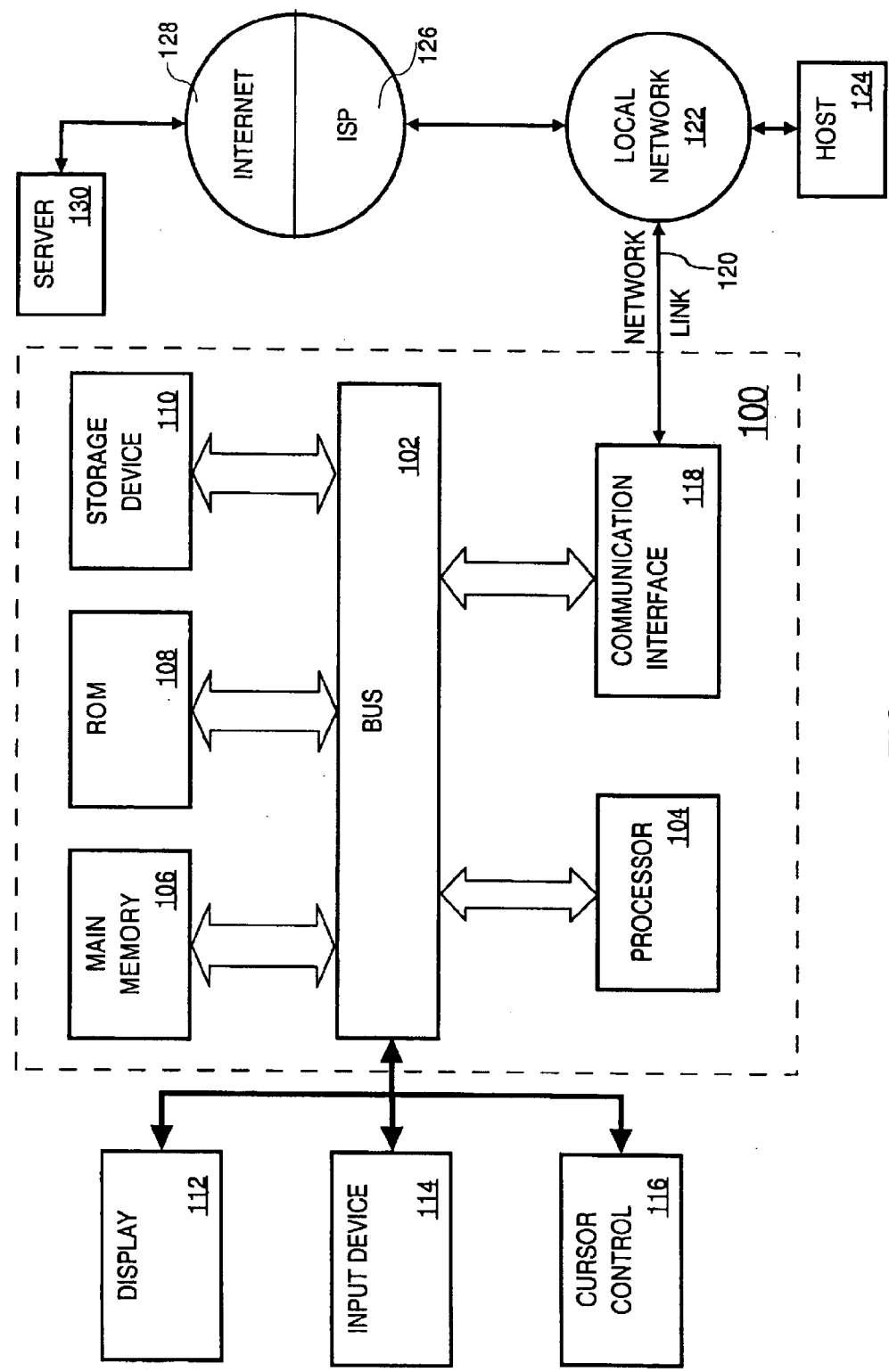
FIG. 1 depicts a computer system on which an embodiment of the present invention can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for secure replication. According to one embodiment of the invention, secure replication is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus- 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for secure replication as described herein. The received code may be executed by processor 104 as it is received, and/or stored in storage device 110, or other non-volatile storage for later execution. In this manner, computer system 100 may obtain application code downloaded on a carrier wave.

Architectural Overview

Figure 2:
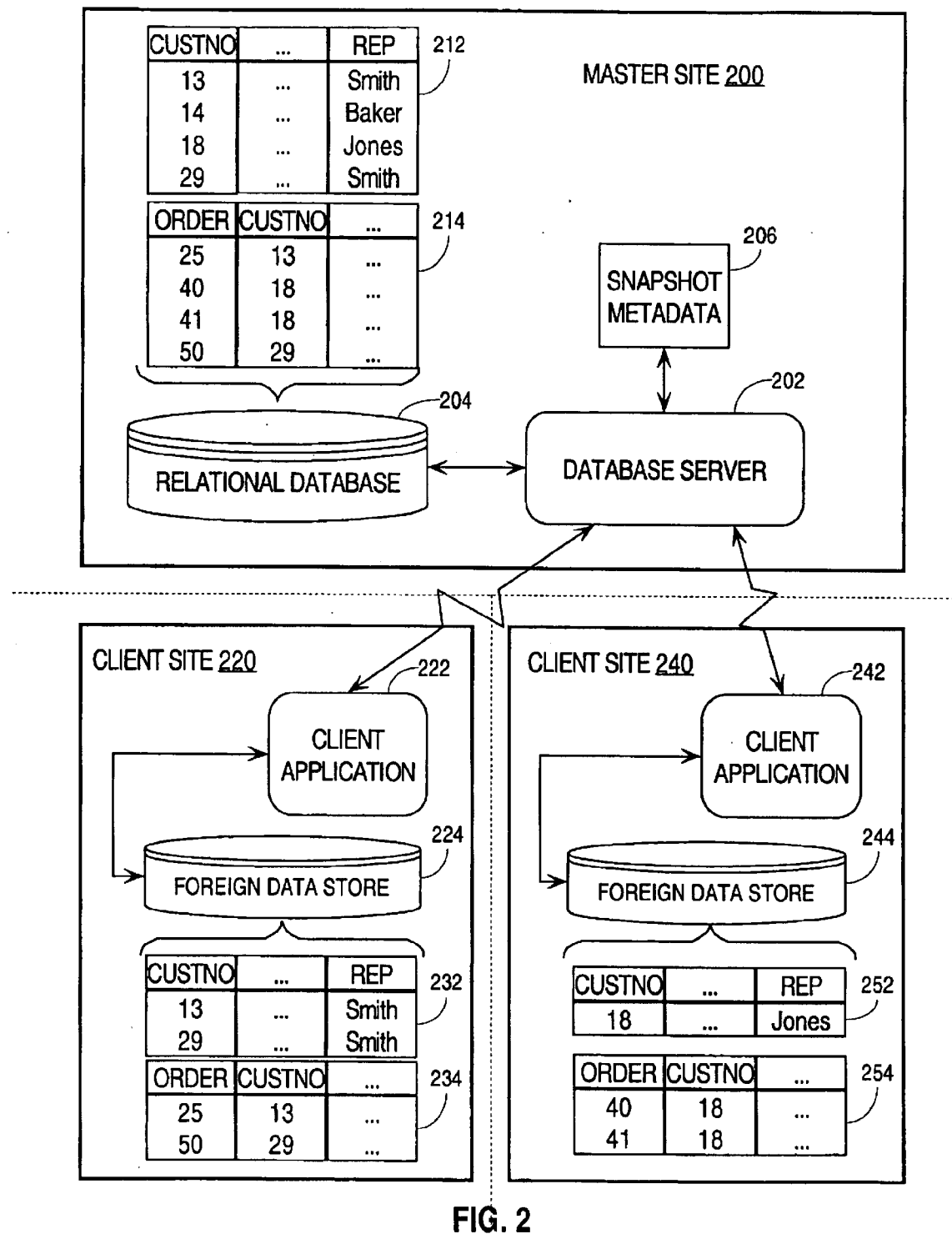
FIG. 2 is a schematic depiction of a snapshot replication environment in accordance with an embodiment.

FIG. 2 depicts an exemplary snapshot replication environment for a company's sales department comprising a master site 200, client site 220, and client site 240. Master site 200, which may be a high-performance computer system at the company's headquarters, includes a relational database server 202 that is responsible for storing and retrieving data from a relational database 204. In this example, relational database 204 contains a customers master table 212 and an orders master table 214. The customers master table 212 is illustrative of the data stored in rows for each customer of the company and includes columns for the customer number CUSTNO and the sales representative REP to whom the customer is assigned. For example, customers 13 and 29 is assigned to sales representative Smith, and customer 18 is assigned to sales representative Jones. The orders master 214 illustrates the data stored in rows for each order that a customer makes and includes a column ORDER that indicates the number of the order and a CUSTNO column that is correlated to the customer in the customer masters table 212. For example, order 25 was placed by customer 13, and orders 40 and 41 were placed by customer 18.

In the illustrated embodiment, client site 220 and client site 240 are laptops that are temporarily connected to the master site 200 by a dial up line or the like, and belong to sales representatives Smith and Jones, respectively. In a front office automation environment, it is desirable for Smith to have a copy of Smith's customer information and a copy of the corresponding order information for those customers at Smith's laptop, i.e. client site 220, and for Jones to have a copy of Jones's customer and order information at Jones's laptop, i.e. client site 240.

Accordingly, client site 220 includes a front office client application 222, for example a thin application implemented in JAVA™ that manages a foreign data store 224 that contains snapshots of the customer master table 212 and the order master table 214 as customer snapshot 232 and order-snapshot 234, respectively. Foreign data store 224 need not be a relational database and may be implemented by less sophisticated means. Since Smith is presumably only interested in Smith's own data, the customer snapshot 232 and order snapshot 234 only keep a subset of the data in the customer master table 212 and the order master table 214, respectively. Specifically, customer snapshot 232 contains the rows for Smith's customers and order snapshot 234 contains the corresponding order information. For example, customer snapshot 232 contains two rows for customers 13 and 29, and rows for orders 25 and 50 are kept in order snapshot 234. The information required to maintain and drive the refreshes for the local snapshots 232, 234, such as the defining queries for the snapshots 232, 234 and the latest refresh times, however, is kept at the master site 200 in snapshot metadata 206, although client site 220 maintains some metadata (not shown) identifying which snapshots are instantiated there, the refresh groups to which they belong, and the columns and column groups of each snapshot. Refresh groups and column groups are described in greater detail hereinafter.

Similarly, client site 240 includes a front office client application 242, such as a thin application implemented in JAVA™ that manages a foreign data store 244 that containing snapshots of the customer master table 212 and the order master table 214 as customer snapshot 252 and order snapshot 254, respectively. Foreign data store 244 need not be a relational database and may be implemented by less sophisticated means. Since Jones is only properly interested in Jones's own data, the customer snapshot 252 and order snapshot 254 only keep a subset of the data in the customer master table 212 and the order master table 214, respectively. Specifically, the customer snapshot 252 contains a row for Jones's customers (e.g. customer 18) and the order snapshot 254 contains the corresponding order information (e.g. orders 40 and 41). The information required to maintain and drive the refreshes for the local snapshots, such as the defining queries for the snapshots and the latest refresh times, however, is kept at the master site 200 in snapshot metadata 206, although client site 240 maintains some metadata identifying which snapshots are instantiated there, the refresh groups t o which they belong, and the columns and column groups of each snapshot.

Refresh Groups

Refresh groups stem from the realization that a laptop user normally expects to refresh all the snapshots used by a suite of front office automation software at the same time to keep the snapshots consistent with one another. A refresh group is a collection of related snapshots that are refreshed at the same time. For example, the various snapshots of a front office application suite can be placed in the same refresh group, to allow them all to be refreshed at the same time.

Figure 3:
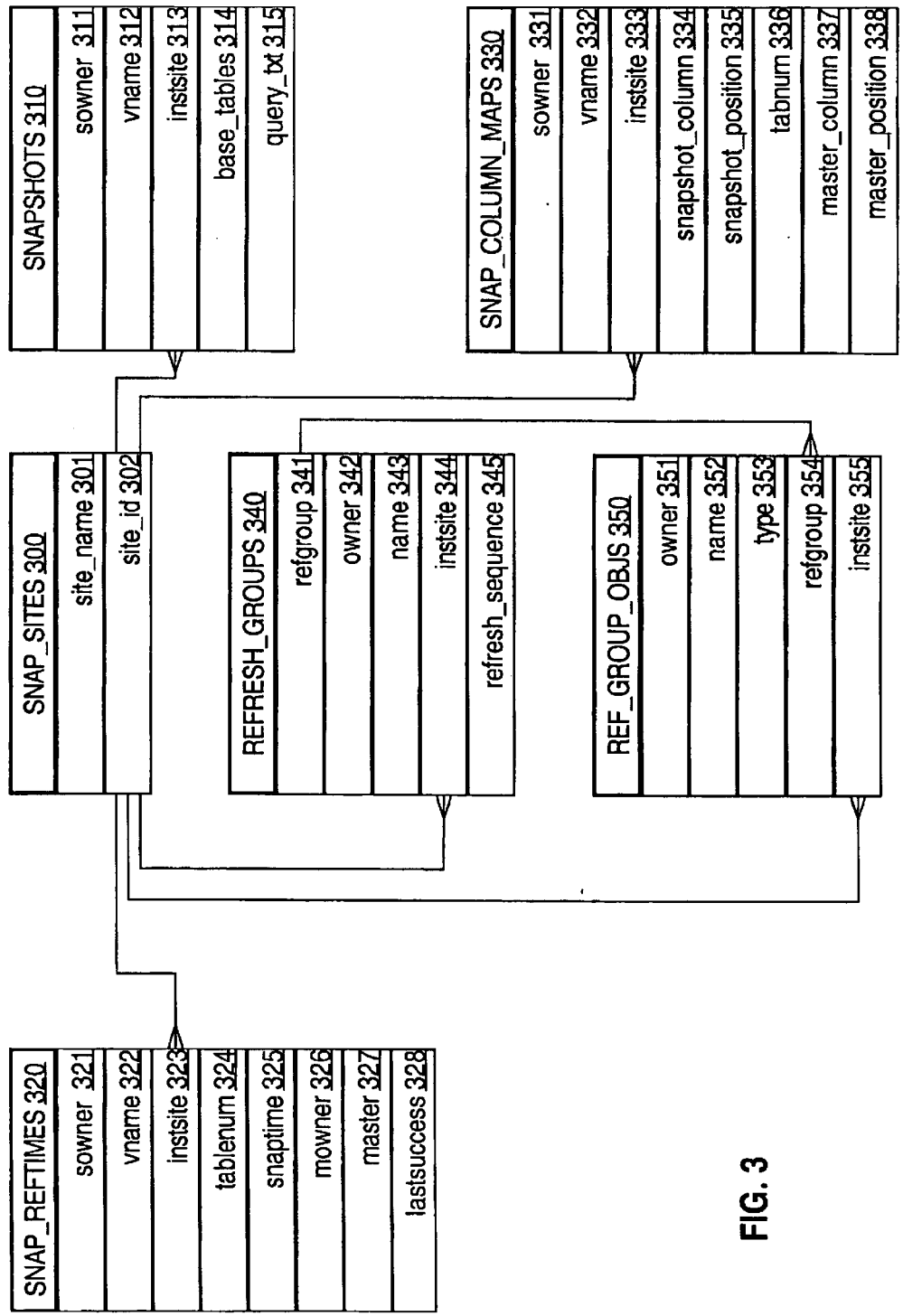
FIG. 3 illustrates snapshot metadata stored at a master site according to an embodiment.

Accordingly, snapshot metadata 206 also stores metadata to maintain refresh groups, which is illustrated in FIG. 3 as a collection of data dictionary tables. The names for the data dictionary tables and their fields are supplied for ease of comprehension and need not reflect the actual name of any data dictionary table and their fields created at a master site 200 in any particular implementation.

Data dictionary table REFRESH_GROUPS 340 holds the metadata for the each refresh group defined at the master site 200. Refgroup 341 contains a number identifying the refresh group, owner 342 identifies the owner of the refresh group, and name 343 is a string storing user-friendly name of the refresh group. Instsite 344 contains an identifier (correlated to site_id 302) of the site at which the refresh group is instantiated.

Data dictionary table REF_GROUP_OBJECTS 350 tracks the objects defined for a refresh group. Each object in the refresh group, for example a snapshot, is identified by a key comprising owner 351 for the name of the owner of the snapshot, name 352 for the name of the object, and instsite 355 for the site identifier (correlated to site_id 302) of the snapshot, thereby uniquely identifying the snapshot. An instsite 355 value of 0, of course, identifies a server-side refresh group object, an improvement compatible with the high-end implementation of snapshot replication. Type 353 indicates the type of the refresh group object and defaults to "snapshot." Refgroup #54 is correlated with refgroup 341 to identify the refresh group for with the object defined.

Refreshing Snapshots

At some point after a refresh group of snapshots 232, 234 has been instantiated at a laptop client site 220, the sales representative will want to refresh the snapshots 232, 234 to bring them up to date. In addition, if the snapshots 232, 234 have been installed as updatable snapshots, the sales representative may have changes such as new customer orders to be uploaded to the master site 200. Accordingly, the sales representative would connect the laptop 220 to the master site 200, for example by a dial up telephone line or the like, and request to update the snapshots 232, 234 on the laptop 220.

Figure 4:
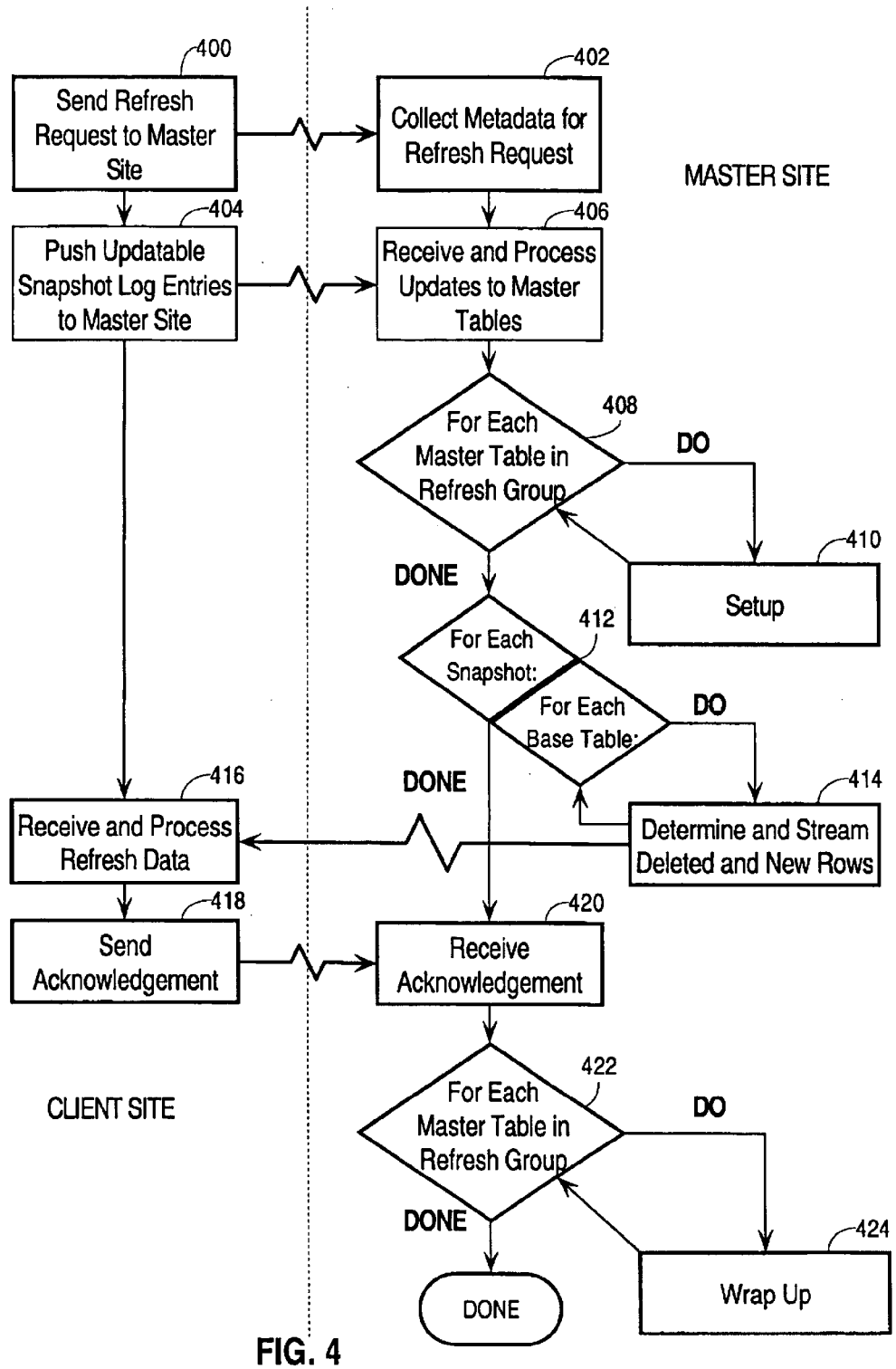
FIG. 4 is a flowchart for refreshing a group of snapshots for an embodiment.

FIG. 4 is a flowchart showing a fast refresh of snapshots 232, 234 on laptop client site 220 in accordance with an embodiment. At step 400, the sales representative connects by giving a login name and password and sends a refresh request to the master site 200, identifying the refresh group to be brought up-to-date and including a refresh sequence number that serves as an acknowledgement that the last refresh was successfully performed. At step 402, the master database server 202 collects the snapshot metadata 206 to process the refresh request.

If the local snapshots are updatable and updates have been indeed been made to the updatable snapshots, the queued updates are pushed to the master site 200 from the locally maintained updatable snapshot queue and the corresponding locally inserted entries in the snapshots are deleted (step 404). The master database server 202, in response, receives the updates, stores them in a temporary table (whose lifetime is that of a database session while the client site 220 is connected to the master site 200), and applies the updates to the master tables (step 406).

At this point, refreshing the snapshots 232, 234 in the specified refresh group is driven entirely at the master site 200, iterating over each snapshot 232, 234 and its master tables 212, 214, to reconcile their differences with the snapshots 232, 234 without incurring numerous round trip RPCs between the master site 200 and the client site 220. In the bulk set up controlled by step 408, the master database server 202 repeatedly performs the set up operation (step 410). The set up operation, which is used because there can be multiple snapshots 232, 252 defined for the same table 212, processes the master log files corresponding to the master tables 212, 214 to set the refresh time of the most recently added changes to the master tables 212, 214 in the master logs to the current refresh time.

In the doubly nested loop controlled by step 412, the master database server 202 formulates SQL select statements based on the snapshot metadata 206 and executes the SQL select statements on the relational database 204, first to determine the deleted rows and then to determine the new rows that updated or inserted. These rows are streamed to the client application 222 at the client site (step 414), preferably by a lightweight row transfer protocol described hereinafter. In response, the client application 222 receives and processes the refresh data in step 416. If the changes are successfully applied, the client application 222 sends an acknowledgement in step 418. In response to receiving the acknowledgement, master database server 202 commits the changes to the master logs (step 420).

Finally, in the bulk wrap up loop controlled by step 422, the master database server 202 performs the wrap up operation (step 424). The wrap up operation, also used because there can be multiple snapshots defined for the same table, purges the master logs of the entries that are older than the least recently refreshed snapshot to prevent the master logs from growing unacceptably large.

It is therefore evident that driving the snapshot refresh at the master site in accordance with an aspect of the invention dramatically reduces the number of round trip RPCs. For example, to refresh a refresh group containing 200 snapshots each using two master tables, the high-end approach required at least 1600 RPCs, but the corresponding master-driven snapshot refresh uses only one round-trip RPCs, to send the refresh request in step 400 and get back the data in step 416.

Security

The interface at steps 400 and 402 for initiating snapshot refreshes to be driven at the master site 200 instead of driving the snapshot refresh entirely from the client site 220 also facilitates the implementation of another security feature pertaining to untrusted users. For untrusted users, granting select privileges even for a specific table may be too generous, because an unauthorized user could gain access the entire customers master table 212 at the master site 200 by using the untrusted user's login and password, even though the accessed laptop only contained a small subset of the customer master table in a customers snapshot.

In this scenario, untrusted users are granted permission only to connect to the master site 200 and to run the refresh program. Thus, an unauthorized users can do little other than to obtain a more recent version of the data the untrusted user was allowed to see by refreshing the local snapshots.

Figure 5:
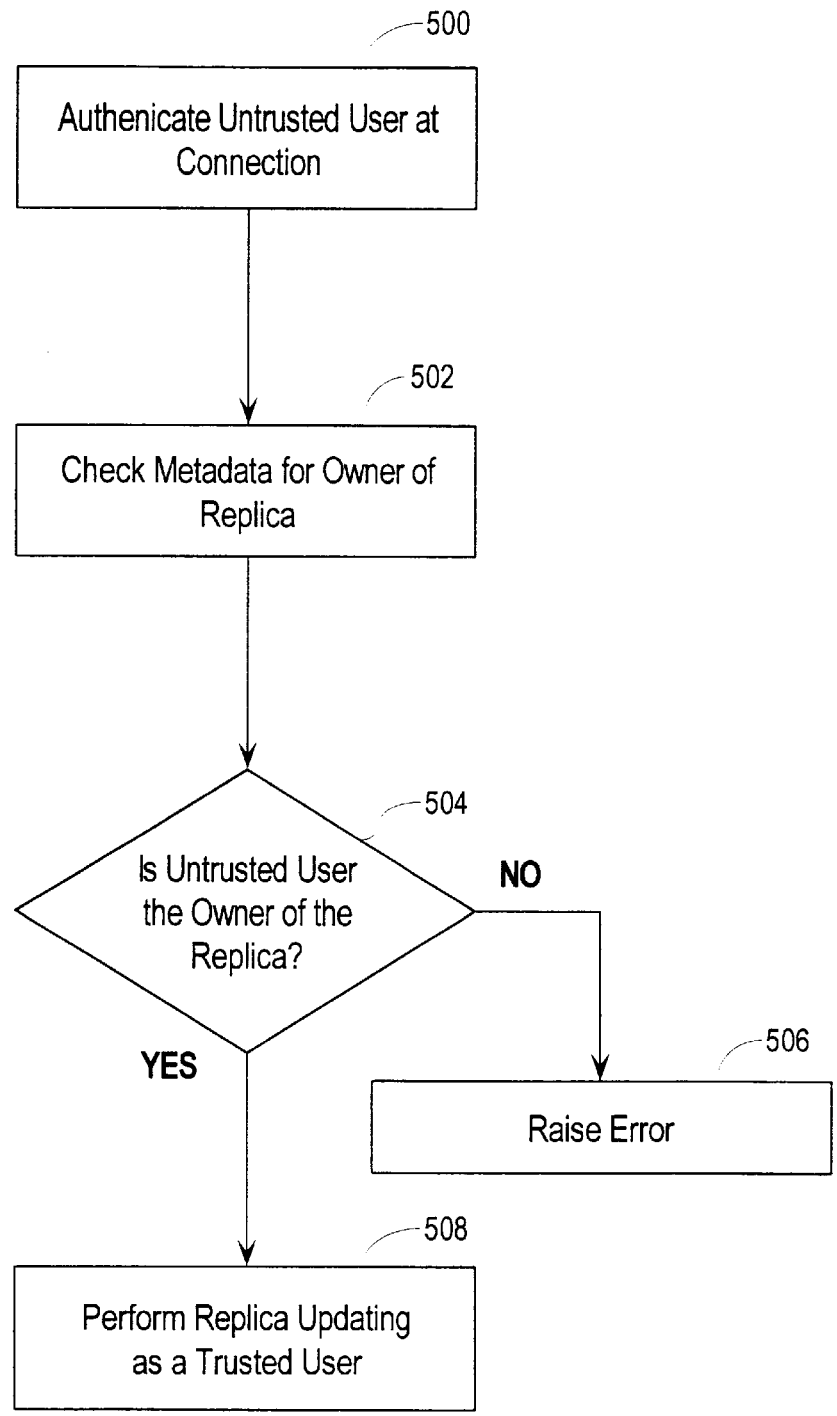
FIG. 5 is a flowchart for authorizing a snapshot owner to refresh a snapshot for an embodiment.

Referring to FIG. 5, the untrusted user is authenticated at connection time with the login and password (step 500) Connection by login and password, however, is an access path also available to an unauthorized user, because the untrusted user may have made the password available to the unauthorized user who found or stole the laptop. The snapshot metadata 206 is checked to determined if the authenticated user is the owner of the refresh group (step 502). If the untrusted user is not the owner of the snapshot (tested at step 504), then an error is raised (step 506) preventing access of the untrusted user to another user's data through the refresh mechanism.

At step 508, the actual refreshing of the snapshot, including reconciling the differences between the snapshot and the master tables, is performed in the security domain of a trusted users, for example, by a UNIX setuid program. Therefore, any untrusted user who obtains a connection to the master site 200, whether an authorized sales representative or a malicious hacker, can do little more than refreshing the local snapshots and perhaps make modifications to the master tables through the updatable snapshot mechanism.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

For example, although the present invention has been extensively described with respect to securely refreshing snapshots for front office automation, it is to be understood that the same techniques disclosed herein are readily applicable to securely refreshing snapshots in a high-end snapshot replication implementation, and other models of data replication.

What is claimed is:

1. A method of secure replication, comprising the steps of:
   authenticating an untrusted user;
   receiving a request from the authenticated untrusted user to refresh a replica of a body of data;
   in response to receiving the request from the authenticated untrusted user, refreshing the replica in a security domain of a trusted user;
   denying permission of the authenticated untrusted user to access the body of data; and
   granting permission of the trusted user to access the body or data.

2. The method of claim 1, further comprising the step of:
   storing metadata about the replica of the body of data, said metadata identifying an owner of the replica of the body of data.

3. The method of claim 2, further comprising the step of:
   accessing the metadata about the replica of the body of data to identity an owner of the replica of the body of data.

4. A method of secure replication, comprising the steps of:
   storing metadata about a replica of a body of data, said metadata identifying an owner of the replica of the body;
   authenticating an untrusted user;
   receiving a request from an authenticated untrusted user to refresh the replica;
   in response to receiving the request, comparing an identity of the authenticated untrusted user and the owner of the replica; and
   if the identity of the authenticated untrusted user and the owner of the replica of the body of data are same, then refreshing the replica in a security domain of a trusted user.

5. The method of claim 4, further comprising:
   granting permission to a the authenticated untrusted user only to connect to a master site and to run a refresh program.

6. The method of claim 5, wherein the authenticated untrusted user does not have permission to access the body of data.

7. A computer-readable medium bearing instructions for secure replication, said instructions arranged to perform the method of claim 5.

8. A computer-readable medium bearing instructions for secure replication, said instructions arranged, when executed by one or more processors, to cause the one or more processors to perform the steps of:
   authenticating an untrusted user;
   receiving a request from the authenticated untrusted user to refresh a replica of a body of data;
   in response to receiving the request from the authenticated untrusted user, refreshing the replica in a security domain of a trusted user;
   denying permission of the authenticated untrusted user to access the body of data; and
   granting permission of the trusted user to access the body of data.

9. The computer-readable medium of claim 8, wherein said instructions are further arranged to cause the one or more processors to perform the step of:
   storing metadata about the replica of the body of data, said metadata identifying an owner of the replica of the body of data.

10. The computer-readable medium of claim 9, wherein said instructions are further arranged to cause the one or more processors to perform the steps of:
    accessing the metadata about the replica of the body of data to identity an owner of the replica of the body of data.

11. A computer-readable medium bearing instructions for secure replication, said instructions arranged, when executed by one or more processors, to cause the one or more processors to perform the steps of:
    storing metadata about a replica of a body of data, said metadata identifying an owner of the replica of the body;
    authenticating an untrusted user; receiving a request from an authenticated untrusted user to refresh the replica;
    in response to receiving the request, comparing an identity of the authenticated untrusted user and the owner of the replica; and
    if the identity of the authenticated untrusted user and the owner of the replica of the body of data are same, then refreshing the replica in a security domain of a trusted user.

* * * * *